(12) United States Patent
Toff et al.

(10) Patent No.: US 11,348,616 B2
(45) Date of Patent: May 31, 2022

(54) COLLABORATIVE VIDEO EDITING IN A CLOUD ENVIRONMENT

(71) Applicant: Google Inc., Mountain View, CA (US)

(72) Inventors: Jason Toff, New York, NY (US); John Gregg, San Francisco, CA (US); Rushabh Ashok Doshi, Menlo Park, CA (US); Robert Steven Glickstein, San Rafael, CA (US); Molly Castle Nix, San Francisco, CA (US)

(73) Assignee: Google LLC, Mountain View, CA (US)

( * ) Notice: Subject to any disclaimer, the term of this patent is extended or adjusted under 35 U.S.C. 154(b) by 813 days.

(21) Appl. No.: 14/090,272

(22) Filed: Nov. 26, 2013

(65) Prior Publication Data

US 2015/0149906 A1    May 28, 2015

(51) Int. Cl.
| | | |
|---|---|---|
| *G06F 3/01* | (2006.01) | |
| *G11B 27/031* | (2006.01) | |
| *G06Q 10/10* | (2012.01) | |

(52) U.S. Cl.
CPC ......... *G11B 27/031* (2013.01); *G06Q 10/101* (2013.01)

(58) Field of Classification Search
CPC . G11B 27/031; G06Q 10/101; G06F 3/04842; G06F 3/0482
USPC .......................................... 386/278; 715/723
See application file for complete search history.

(56) References Cited

U.S. PATENT DOCUMENTS

| | | |
|---|---|---|
| 8,341,525 B1 | 12/2012 | Achour et al. |
| 2008/0013916 A1 | 1/2008 | Sharpe et al. |
| 2009/0196570 A1* | 8/2009 | Dudas .................. G11B 27/034 386/278 |
| 2010/0260468 A1 | 10/2010 | Khatib et al. |

(Continued)

FOREIGN PATENT DOCUMENTS

| | | |
|---|---|---|
| CN | 101330388 | 12/2008 |
| CN | 102132269 | 7/2011 |

(Continued)

OTHER PUBLICATIONS

International Searching Authority, "Notification of Transmittal of the International Search Report and the Written Opinion of the International Search Authority, or the Declaration," for International Application No. PCT/US2014/058094, dated Jan. 8, 2015, 12 pages.

(Continued)

*Primary Examiner* — Hassan Mrabi
(74) *Attorney, Agent, or Firm* — Lowenstein Sandler LLP

(57) ABSTRACT

The subject matter of this specification can be implemented in, among other things, a method that includes causing presentation of a collaborative video project to a first user account that includes a set of one or more shared video clips and a set of one or more personal video clips. The method includes receiving from the first user account a first selection of a video clip in the set of personal video clips and, in response, adding the video clip to the set of shared video clips. The method includes causing presentation of the collaborative video project to a second user account, including presentation of the set of shared video clips. The method includes receiving from the second user account a second selection of the video clip and, in response, adding the video clip to a collaborative video for the collaborative video project.

19 Claims, 5 Drawing Sheets

(56) References Cited

U.S. PATENT DOCUMENTS

| | | | |
|---|---|---|---|
| 2011/0026898 A1* | 2/2011 | Lussier | G11B 27/034 386/280 |
| 2011/0078573 A1 | 3/2011 | Ooba | |
| 2011/0167036 A1 | 7/2011 | Liebman | |
| 2011/0265147 A1 | 10/2011 | Liu | |
| 2012/0042251 A1* | 2/2012 | Rodriguez | G11B 27/034 715/723 |
| 2012/0201517 A1 | 8/2012 | Sakuragi et al. | |
| 2013/0282857 A1 | 10/2013 | Stamper | |
| 2014/0186004 A1* | 7/2014 | Hamer | G11B 27/034 386/223 |

FOREIGN PATENT DOCUMENTS

| | | |
|---|---|---|
| CN | 102882976 | 1/2013 |
| JP | 2002251621 A | 9/2002 |
| JP | 2011070511 A | 4/2011 |
| JP | 2012165313 A | 8/2012 |
| KR | 10-2009-0056506 | 3/2009 |
| KR | 10-2013-0044571 | 5/2013 |
| WO | 2013085570 A2 | 6/2013 |

OTHER PUBLICATIONS

Japanese Office Action for Japanese Application No. 2016-534153, dated Oct. 2, 2017, 6 pages.

Anonymous: "WeVideo, "How Do I Collaborate with Others?, Nov. 9, 2013 (Nov. 9, 2013), XP055358194, Retrieved from the Internet: URL:http://web.archive.org/web/20131109202433/https://wevideo.desk.com/customer/portal/articles843803-how-do-i-collaborate-with-others-, retrieved on Mar. 23, 2017, the whole document.

Jan Ozer, "WeVideo Review: The Top Browser-Based Editor, but Still Limited—Streaming Media Magazine", Feb. 2, 2012 Feb. 2, 2012), XP055358227, Retrieved from the Internet: URL:http://web.archive.org/web/20120202153910/http://wwwstreamingmedia.com/Articles/Editonal/Featured-Articles/WeVideo-Review-The-Top-Browser-Based-Editor-but-Still-Limited-79260.aspx, retrieved on Mar. 23, 2017, the whole document.

Supplementary European Search Report for EP 14 86 5424, dated Apr. 2, 2017, 10 pages.

Chinese Office Action for Chinese Application No. 201480064782.3, dated Mar. 27, 2018, 12 pages.

Japanese Office Action for Japanese Application No. 2016-534153, dated Apr. 27, 2018, 5 pages.

Examination Report for Indian Patent Application No. 201647020951 dated Nov. 26, 2019; 7 pages, including in-line translation.

Hearing Notice for Indian Patent Application No. 201647020951 dated May 24, 2021, 3 pages, including in-line translation.

* cited by examiner

COLLABORATIVE VIDEO EDITING IN A CLOUD ENVIRONMENT

TECHNICAL FIELD

This instant specification relates to collaborative video editing in a cloud environment.

BACKGROUND

Video editing systems typically include software that manages post-production video editing of digital video sequences or clips. Video editing systems often allow for non-linear editing in which the video clips are laid out in a timeline interface. Video editing systems may offer tools for trimming, splicing, cutting, and arranging the video clips across the timeline. In addition, video editing systems may offer tools for color manipulation, titling, visual effects, and editing or mixing audio synchronized with the video. Video editing systems then allow a video project to be exported to a variety of formats for presentation on a particular type of device or with a particular application.

SUMMARY

In one aspect, a method includes causing, by a processing device, presentation of a collaborative video project to a first user account in a plurality of user accounts with which the collaborative video project is shared. The collaborative video project presented to the first user account includes a set of one or more shared video clips that are accessible by the plurality of user accounts and a first set of one or more video clips that are accessible by the first user account and not accessible within the collaborative video project by ones of the plurality of user accounts other than the first user account. The method further includes receiving a first user input from the first user account that includes a selection of a first video clip in the first set of one or more video clips. The method further includes in response to receiving the first user input, adding the first video clip to the set of one or more shared video clips. The method further includes causing, by the processing device, presentation of the collaborative video project to a second user account in the plurality of user accounts. The collaborative video project presented to the second user account includes the set of one or more shared video clips and a second set of one or more video clips that are accessible by the second user account and not accessible within the collaborative video project by ones of the plurality of user accounts other than the second user account. The method further includes receiving a second user input from the second user account that includes a selection of the first video clip in the shared set of one or more video clips presented to the second user account. The method further includes in response to receiving the second user input, adding the first video clip to a collaborative video for the collaborative video project.

Implementations can include any, all, or none of the following features. The method can include receiving a third user input from the second user account that can include a selection of a first video editing operation to perform on the first video clip in the collaborative video. The method can further include in response to receiving the third user input, performing the first video editing operation on the first video clip in the collaborative video. The method can include receiving a fourth user input from the second user account that can include a selection of a second video clip in the second set of one or more video clips. The method can further include in response to receiving the fourth user input, adding the second video clip to both the set of one or more shared video clips and the collaborative video. The method can include receiving a fifth user input from the second user account that can include a selection of a second video editing operation to perform on the second video clip in the collaborative video. The method can further include in response to receiving the fifth user input, performing the second video editing operation on the second video clip in the collaborative video. The method can include receiving a sixth user input from the first user account that can include a request to add the second user account to the plurality of user accounts. The method can further include in response to receiving the sixth user input, adding the second user account to the plurality of user accounts with which the collaborative video project can be shared. The method can include in response to adding the second user account to the plurality of user accounts, sending a notification to the second user account that the second user account has been added to the plurality of user accounts. The notification can include a link to the collaborative video project. The method can further include in response to a selection of the link by the second user account, receiving a request to present the collaborative video project. Causing the presentation of the collaborative video project to the second user account can be in response to receiving the request to present the collaborative video project. Each user account in the plurality of user accounts can include a user account that has access to the link.

In one aspect, a non-transitory computer-readable medium having instructions stored thereon that, when executed by a processing device, cause the processing device to perform operations includes causing, by the processing device, presentation of a collaborative video project to a first user account in a plurality of user accounts with which the collaborative video project is shared. The collaborative video project presented to the first user account includes a set of one or more shared video clips that are accessible by the plurality of user accounts and a first set of one or more video clips that are accessible by the first user account and not accessible within the collaborative video project by ones of the plurality of user accounts other than the first user account. The operations further include receiving a first user input from the first user account that includes a selection of a first video clip in the first set of one or more video clips. The operations further include in response to receiving the first user input, adding the first video clip to the set of one or more shared video clips. The operations further include causing, by the processing device, presentation of the collaborative video project to a second user account in the plurality of user accounts. The collaborative video project presented to the second user account includes the set of one or more shared video clips and a second set of one or more video clips that are accessible by the second user account and not accessible within the collaborative video project by ones of the plurality of user accounts other than the second user account. The operations further include receiving a second user input from the second user account that includes a selection of the first video clip in the shared set of one or more video clips presented to the second user account. The operations further include in response to receiving the second user input, adding the first video clip to a collaborative video for the collaborative video project.

Implementations can include any, all, or none of the following features. The operations can further include receiving a third user input from the second user account that can include a selection of a first video editing operation to perform on the first video clip in the collaborative video. The operations can further include in response to receiving the third user input, performing the first video editing operation on the first video clip in the collaborative video. The operations can further include receiving a fourth user input from the second user account that can include a selection of a second video clip in the second set of one or more video clips. The operations can further include in response to receiving the fourth user input, adding the second video clip to both the set of one or more shared video clips and the collaborative video. The operations can further include receiving a fifth user input from the second user account that can include a selection of a second video editing operation to perform on the second video clip in the collaborative video. The operations can further include in response to receiving the fifth user input, performing the second video editing operation on the second video clip in the collaborative video. The operations can further include receiving a sixth user input from the first user account that can include a request to add the second user account to the plurality of user accounts. The operations can further include in response to receiving the sixth user input, adding the second user account to the plurality of user accounts with which the collaborative video project can be shared. The operations can further include in response to adding the second user account to the plurality of user accounts, sending a notification to the second user account that the second user account has been added to the plurality of user accounts. The notification can include a link to the collaborative video project. The operations can further include in response to a selection of the link by the second user account, receiving a request to present the collaborative video project. Causing the presentation of the collaborative video project to the second user account can be in response to receiving the request to present the collaborative video project.

In one aspect, a system includes an interface to receive a first user input from a first user account in a plurality of user accounts with which a collaborative video project is shared. The collaborative video project presented to the first user account includes a set of one or more shared video clips that are accessible by the plurality of user accounts and a first set of one or more video clips that are accessible by the first user account and not accessible within the collaborative video project by ones of the plurality of user accounts other than the first user account. The first user input includes a selection of a first video clip in the first set of one or more video clips. The interface is further to receive a second user input from a second user account in the plurality of user accounts. The collaborative video project presented to the second user account includes the set of one or more shared video clips and a second set of one or more video clips that are accessible by the second user account and not accessible within the collaborative video project by ones of the plurality of user accounts other than the second user account. The second user input includes a selection of the first video clip in the shared set of one or more video clips presented to the second user account. The system further includes a processing device to cause presentation of the collaborative video project to the first user account. In response to receipt of the first user input, the processing device is further to add the first video clip to the set of one or more shared video clips. The processing device is further to cause presentation of the collaborative video project to the second user account. In response to receipt of the second user input, the processing device is further to add the first video clip to a collaborative video for the collaborative video project.

Implementations can include any, all, or none of the following features. The interface can be further to receive a third user input from the second user account that can include a selection of a first video editing operation to perform on the first video clip in the collaborative video. In response to receipt of the third user input, the processing device can be further to perform the first video editing operation on the first video clip in the collaborative video. The interface can be further to receive a fourth user input from the second user account that can include a selection of a second video clip in the second set of one or more video clips. In response to receipt of the fourth user input, the processing device can be further to add the second video clip to both the set of one or more shared video clips and the collaborative video. The interface can be further to receive a fifth user input from the second user account that can include a selection of a second video editing operation to perform on the second video clip in the collaborative video. In response to receipt of the fifth user input, the processing device can be further to perform the second video editing operation on the second video clip in the collaborative video. The interface can be further to receive a sixth user input from the first user account that can include a request to add the second user account to the plurality of user accounts. In response to receipt of the sixth user input, the processing device can be further to add the second user account to the plurality of user accounts with which the collaborative video project can be shared. In response to addition of the second user account to the plurality of user accounts, the processing device can be further to send a notification to the second user account that the second user account has been added to the plurality of user accounts. The notification can include a link to the collaborative video project. In response to a selection of the link by the second user account, the interface can be further to receive a request to present the collaborative video project. The processing device can be further to cause the presentation of the collaborative video project to the second user account in response to receipt of the request to present the collaborative video project.

In one aspect, a system includes an interface to receive a second user input from a second user account in a plurality of user accounts with which a collaborative video project is shared. The collaborative video project presented to the second user account includes a set of one or more shared video clips that are accessible by the plurality of user accounts and a second set of one or more video clips that are accessible by the second user account and not accessible within the collaborative video project by ones of the plurality of user accounts other than the second user account. The set of one or more shared video clips includes a first video clip that was previously within a first set of one or more video clips that are accessible by a first user account and not accessible within the collaborative video project by ones of the plurality of user accounts other than the first user account and subsequently added to the set of one or more shared video clips in response to a first user input from the first user account. The second user input includes a selection of the first video clip in the shared set of one or more video clips presented to the second user account. The system further includes a processing device to cause presentation of the collaborative video project to the second user account. In response to receipt of the second user input, the processing device is to add the first video clip to a collaborative video for the collaborative video project.

The details of one or more implementations are set forth in the accompanying drawings and the description below.

Other features and advantages will be apparent from the description and drawings, and from the claims.

DETAILED DESCRIPTION

This document describes systems and techniques for collaborative video editing. The system and techniques allow users of a video management system to share video clips with one another within a user interface of the video management system. The users may then collaborate on a video editing project, within the user interface, that combines the video clips into a video.

For example, a user named Adam may take footage of an event and upload his footage to his account at the video management system. He may edit his video within the user interface provided by the video management system. Other users, such as Bertha and Charles, may also upload their footage to their accounts at the video management system. Adam may then invite Bertha and Charles to contribute to his editing project. Adam may start by piecing together a video, including clips that Bertha and Charles have authorized him to use. Meanwhile, Bertha may works on the opening title and closing credits for the video. All the while, Charles is may be adding enhancements to the video clips that Adam chose, such as stabilization and color correction. Once satisfied, Adam may publish the video to his account, with credits automatically applied to the contributions of Bertha and Charles.

This approach is advantageous for multiple reasons. The approach saves time by allowing multiple people to work concurrently on the same video project. This approach splits the work across several people versus all of the video editing work being done by one person. This approach enables collaboration between people who may be different or remote locations from one another. This approach may perform processing of the video at one or more centrally located systems (e.g., in the cloud), such as the video management system, rather than at the client computer devices of the users, which may free up local resources for other uses by the users.

Figure 1:
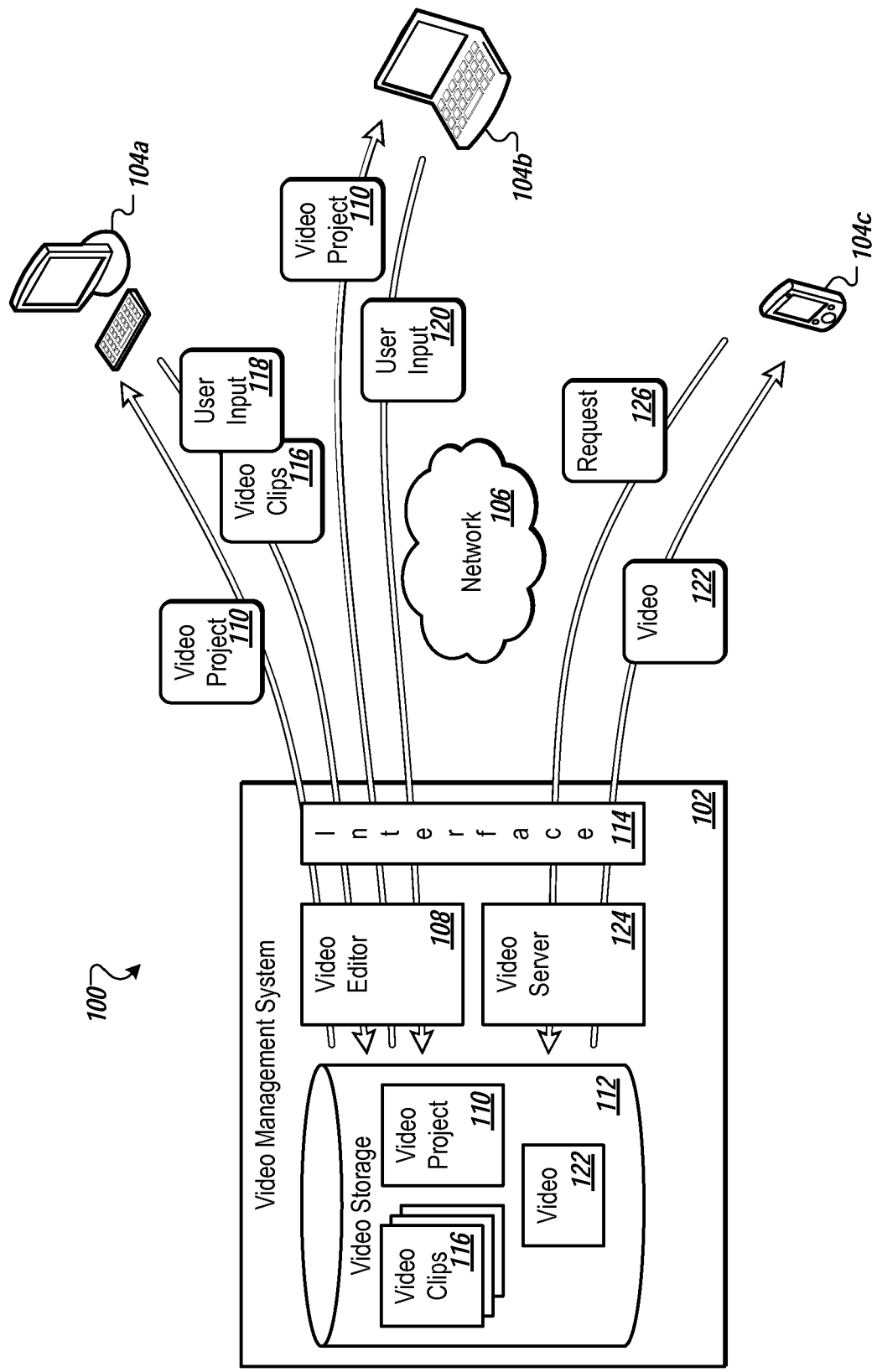
FIG. 1 is a schematic diagram that shows an example of a system for collaborative video editing in a cloud environment.

FIG. 1 is a schematic diagram that shows an example of a system 100 for collaborative video editing in a cloud environment. The system 100 includes a video management system 102 in communication with multiple client computer devices 104a-c over a network 106, such as local network, a wide network, or one or more of the computer devices that make up the Internet. The video management system 102 may include one or more computer devices that provide video editing and/or hosting services over the network 106. In some implementations, the video management system 102 may be referred to as a cloud based service due to providing its services to the client computer devices 104a-c over the network 106. The client computer devices 104a-c may include, for example, desktop, laptop, and/or mobile computer devices.

The video management system 102 includes a video editor 108. The video editor 108 provides information for a user interface to one or more of the client computer devices 104a-c for editing video in a video project 110. The video editor 108 may store the information for the video project 110 in a video storage 112. The video editor 108 may provide the information for the video project 110 to the first client computer device 104a through an interface 114 to the network 106.

The information for the video project 110 may include, for example, data representing the video project 110. The information for the video project 110 may also include markup and/or scripting code, such as Hypertext Markup Language (HTML), Extensible Markup Language (XML), Cascading Style Sheets (CSS), and JavaScript. The markup and/or scripting code may include instructions for presentation and interaction with the data at the first client computer device 104a. For example, the client computer devices 104a-c may include web browser applications that send requests for the video project 110 and then interpret the data, markup, and scripting code to present the user interface for the video project 110. Alternatively, the client computer devices may include standalone applications that present the data and/or process the markup and scripting code for the video project 110. A standalone application may include, for example, a desktop application and/or a mobile device app.

A first user may have a first user account at the video management system 102. The first user may be physically located at a client computer device, such as the first client computer device 104a, and may upload one or more video clips 116 to the video management system 102 from the first client computer device 104a. The video management system 102 may store the video clips 116 in the video storage 112 or another data storage.

The video management system 102 may allow the first user account to control access to the video clips 116. For example, the video management system 102 may initially only allow the first user account to access the video clips 116 and prevent access to the video clips 116 within the video project 110 from collaborating user accounts other than the first user account. Subsequently, the video management system 102 may receive user inputs from the first user account to allow access to the video clips 116 from one or more specific user accounts or to allow access to a video clip in the video clips 116 from any user account that has a link to the video clip.

For example, the video editor 108 may receive a first user input 118 from the first user account at the first client computer device 104a. The first user input 118 includes a selection of at least one of the video clips 116. The first user input 118 indicates that the video editor 108 is to share the selected video clip with one or more other user accounts that are participating in the collaborative editing of the video project 110, such as a second user account at the second client computer device 104b.

The video editor 108 may also receive one or more user inputs from the first user account indicating that the video editor 108 is to allow the second user account, and/or other user accounts, to collaborate on the editing of the video project 110. In some implementations, the first user at the first client computer device 104a may make the first user input 118 that selects one or more of the video clips 116 for sharing without selecting user accounts with which to share the selected video clips. The video editor 108 may automatically share the selected video clips with the user accounts that were previously identified as collaborators on the video project 110.

The video editor 108 then provides the information for the video project 110 to the second user account at the second client computer device 104b, which is also a collaborator on the video project 110. For example, the second client computer device 104b may send a request to the video editor 108 for the video project 110. The video editor 108 determines that the second user account has been identified as a collaborator and provides access to the video project 110. The video editor 108 provides information for the video project 110 to the second client computer device 104b that includes a set of video clips accessible by the second user account and not accessible within the video project 110 by other user accounts as well as the set of shared video clips for collaborators of the video project 110.

The video editor 108 receives a second user input 120 from the second client computer device 104b. The second user input selects one of the video clips 116, which was shared with the collaborators for the video project 110, for performance of an operation. For example, the operation may be addition of the clip to a video 122 for the video project 110. Alternatively, the operation may include another type of operation, such as a transition for the video clip or a text annotation for the video clip. In response to the second user input 120, the video editor 108 performs the requested operation, such as adding the selected shared video clip to the video 122 for the video project 110.

By storing the video project 110 centrally in the video storage 112 at the video management system 102, multiple user accounts are able to concurrently edit the video project 110 from different locations and/or devices. For example, the first account at the first client computer device 104a and the second user account at the second client computer device 104b may concurrently make changes to the video project 110, such as by adding or removing video clips, accompanying audio, transitions, text annotations, and/or video enhancements.

The video editor 108 may then render and/or publish the video 122, for example, in response to a request from a collaborator at a client computing device. In some implementations, the video editor 108 only allows an original creator of the video project 110 or an account designated as the owner of the video project 110 to publish or commit the video 122. The video editor 108 may store the video 122 in the video storage 112 or another data storage. The video editor 108 may publish the video 122 by making the video 122 available publically or to other user accounts that were not collaborators on the video project 110.

The video management system 102 includes a video server 124. The video server 124 receives a request 126 for the video 122 from a client computer device, such as the third client computer device 104c. In response to receiving the request 126, the video server 124 provides the video 122 to the third client computer device 104c. In some implementations, the video server 124 may make the video 122 publically available. Alternatively, the video editor 108, or another component of the video management system 102, may receive an input that specifies, for example, particular user accounts, devices, and/or regions, etc. that may view the video 122. The video server 124 then determines whether the request 126 is from the specified user account, device, and/or region, etc. before providing the video 122 to the third client computer device 104c.

Figure 2A:
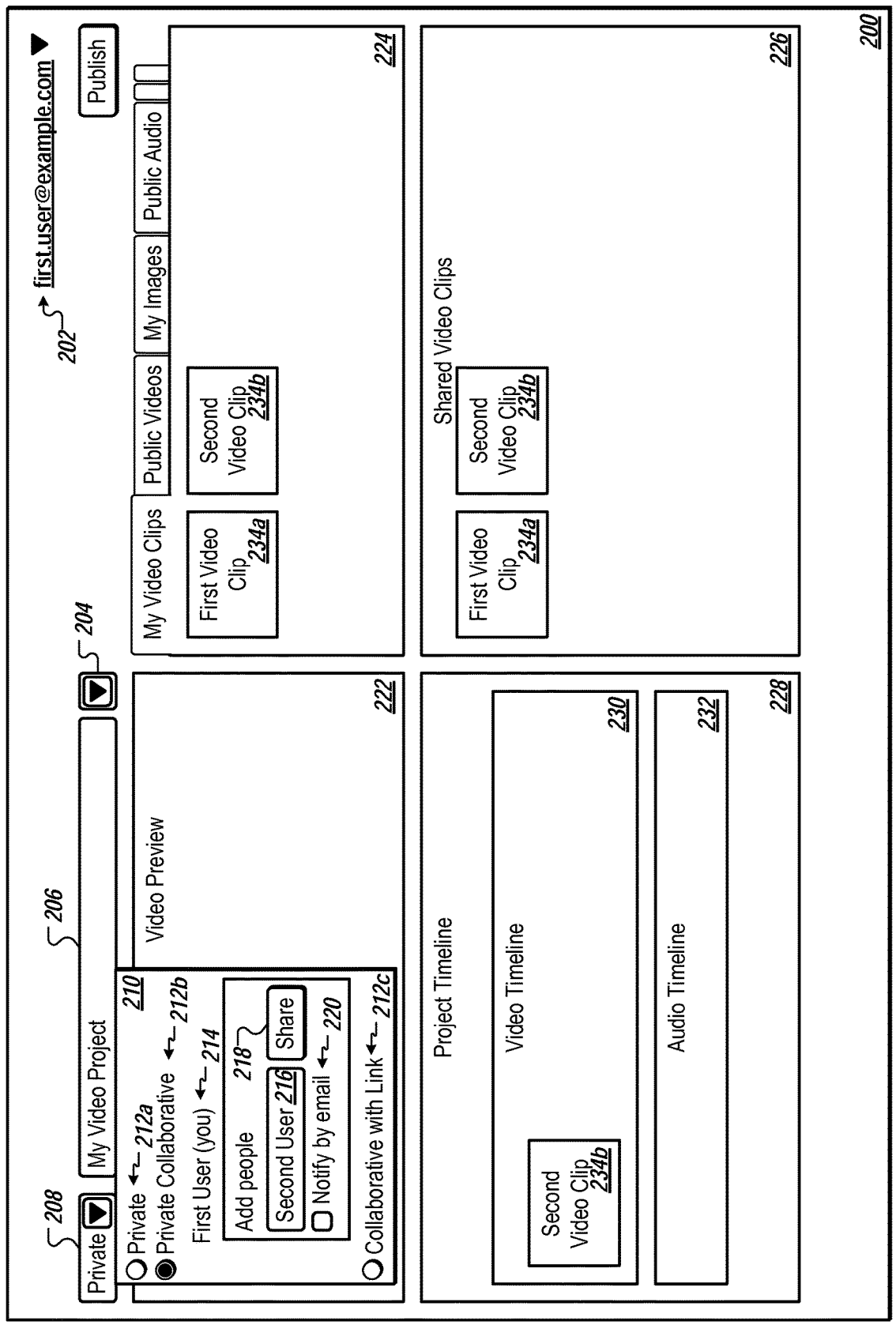
FIGS. 2A-B show examples of user interfaces for collaborative video editing in a cloud environment.

FIG. 2A shows an example of a first user interface 200 for collaborative video editing in a cloud environment. The first user interface 200 provides an interface for editing a video project, such as the video project 110 described with respect to FIG. 1. The first user interface 200 includes a user account indication 202 that indicates which user account is currently authenticated to the video management system 102, such as the first user account. The video management system 102 may provide information for the first user interface 200 to a client computer device, such as the first client computer device 104a.

The first user interface 200 includes a project input control 204 and a title input control 206. Upon selection by a user, the project input control 204 presents a menu of project options. For example, the project options may include creating a new video project, deleting a video project, or selecting another video project for editing. A user may make an input in the title input control 206 to change the title of the video project and/or the video generated from the video project.

The first user interface 200 also includes a sharing input control 208. The sharing input control 208 indicates the current sharing type of the video project 110. As shown in the sharing input control 208 of FIG. 2A, the video project 110 is currently "Private." The "Private" sharing type restricts access to the video project 110 to the creator of the project, e.g., the first user account. The first user may select the sharing input control 208 to open a menu 210 of sharing options.

The menu 210 includes multiple sharing type controls 212a-c. The first sharing type control 212a corresponds to the "Private" sharing type. The second sharing type control 212b corresponds to a "Private Collaborative" sharing type and the third sharing type control 212c corresponds to a "Collaborative with Link" sharing type. The "Collaborative with Link" sharing type allows user accounts that have been provided a link, such as a Uniform Resource Locator (URL) or Identifier (URI), to the video project 110 to collaborate on the video project 110.

The "Private Collaborative" sharing type allows specific user accounts to collaborate on the video project 110. As shown in FIG. 2A, the first user account has selected the second sharing type control 212b for the "Private Collaborative" sharing type. The menu 210 includes a list 214 of the user accounts that are currently identified as collaborators, which may include the creator of the video project 110 (e.g., the first user account). The menu 210 also includes a collaborator input control 216 that allows a user to specify additional collaborators for the video project 110.

As shown in FIG. 2A, the first user account has entered an identifier of the second user account, such as a name or other identifier of the second user account, in the collaborator input control 216. The first user interface 200 and/or the video editor 108 may check to see if the identifier corresponds to a user account within the video management system 102. If the identifier does correspond to a user account, then the first user interface 200 and/or the video editor 108 may highlight and/or autocomplete the identifier to a corresponding identifier of the second user account.

The first user interface 200 may then receive a selection of a share control 218 from the first user account to confirm that the recognized user account is to be made a collaborator. The first user interface 200 may also receive a selection of an email control 220 from the first user account that indicates the added user account or accounts should be notified, e.g., by email, that they were added to the video project 110 as collaborators. In some implementations, the notification may include a link to the video project 110.

The first user interface 200 also includes a video preview area 222, a personal video clips area 224, a shared video clips area 226, and a project timeline area 228. The video preview area 222 presents a preview of the video 122 that is being created in the video project 110. The video preview area 222 may include controls for presenting the video 122, such as play, pause, volume, and a slider control to jump to a location within the video 122, etc.

The project timeline area 228 provides a timeline view of the video project 110. The project timeline area 228 may include a video timeline 230 for visual elements of the video project 110 and an audio timeline 232 for audible elements of the video project 110. The video timeline 230 and the audio timeline 232 may provide for non-linear editing of the video project 110.

The personal video clips area 224 presents one or more video clips 234*a-b* that are accessible by the first user account and not necessarily accessible by user accounts other than the first user account or at least not already accessible by user accounts other than the first user account within the video project 110. For example, the video management system 102 may receive the video clips 234*a-b* from the first user account in an upload. The video management system 102 may by default initially only allow the account that provided the video clips 234*a-b* to the video management system 102 to access the video clips 234*a-b* and may prevent access to the video clips 234*a-b* within the video project 110 from other user accounts.

The first user interface 200 may receive an input from the first user account to add a video clip, such as the first video clip 234*a*, from the personal video clips area 224 to the shared video clips area 226. The shared video clips area 226 presents video clips that have been shared with the other collaborators of the video project 110. The first user interface 200 may, for example, allow the first user account to select and drag the first video clip 234*a* from the personal video clips area 224 to the shared video clips area 226. In another example, the first user interface 200 may provide a context menu, e.g., in response to selection of a video clip in the personal video clips area 224, that includes an option for adding the selected video clip to the shared video clips area 226.

In some implementations, the first user interface 200 may automatically add a video clip to the shared video clips area 226. For example, the first user interface 200 may receive an input from the first user account that adds the second video clip 234*b* to a particular location within the video timeline 230 for the video project 110, such as by dragging the second video clip 234*b* to the video timeline 230 or by selecting an option in a context menu for the second video clip 234*b*. In response, the first user interface 200 and/or the video editor 108 may automatically add the second video clip 234*b* to the shared video clips area 226 for the video project 110.

Once a video clip has been added to the shared video clips area 226, then other user accounts that are collaborators on the video project 110 may use the shared video clip within the video project 110. This may be despite the video clip originally only being accessible by the current user account. In some implementations, the first user interface 200 and/or the video editor 108 only provide the collaborators with access to the shared video clips while the collaborators are editing the video project 110. For example, if the first user interface 200 receives an input from the first user account that selects another video project for presentation, such as by an input in the project input control 204, then the first user interface 200 may present a new set of shared video clips in the shared video clips area 226 for the newly selected video project. The new set of shared video clips for the newly selected video project may be different than the set of shared video clips for the video project 110 despite the two video projects having one or more of the same collaborators.

The video editor 108 may store separate access controls for each video clip for each video project. For example, in view of access controls for the second video clip 234*b* within a first video project, the video editor 108 may provide access to the second video clip 234*b* to the second user account within the first video project. However, the video editor 108 may not provide access to the second video clip 234*b* to the second user account within a second video project unless the video editor 108 receives an input from the first user account within the second video project directing the video editor 108 to provide access to the second video clip 234*b* to the second user account within the second video project.

Figure 2B:
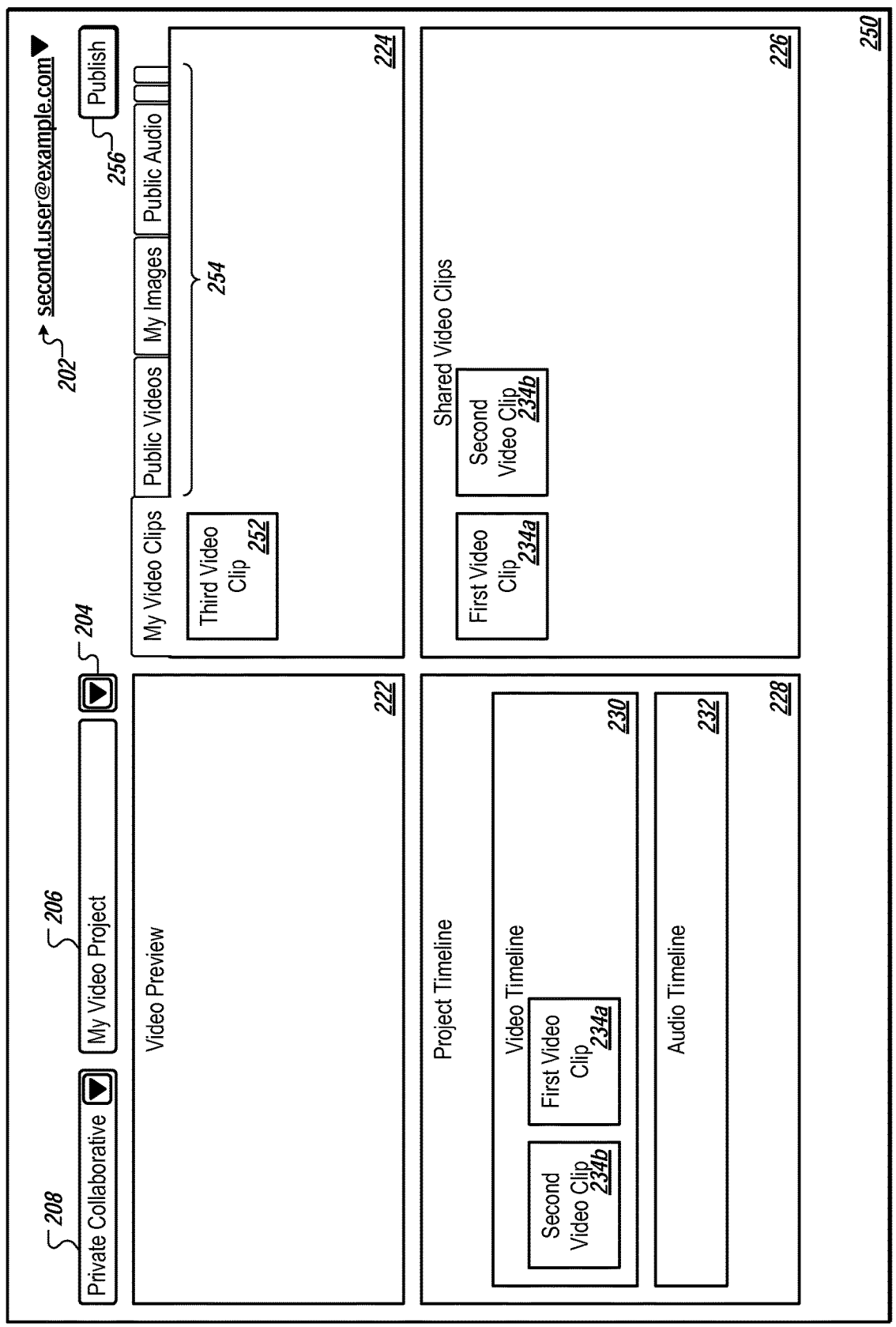

FIG. 2B shows an example of a second user interface 250 for collaborative video editing in a cloud environment. The second user interface 250 provides an interface for editing a video project, such as the video project 110 described with respect to FIG. 1. The second user interface 250 includes the user account indication 202 that indicates which user account is currently authenticated to the video management system 102, such as the second user account. The video management system 102 may provide information for the second user interface 250 to a client computer device, such as the second client computer device 104*b*. The second user interface 250 and/or the video editor 108 may receive a request to present the video project 110 to the second user account, e.g., by selection of the video project 110 in the project input control 204 or by selection of a link to the video project 110 in the notification sent to the second user account.

While a number of the elements within the second user interface 250 may remain the same or substantially the same as the first user interface 200, some may change. In response to the first user account adding the second user account as a collaborator, the sharing input control 208 now indicates that the video project 110 is "Private Collaborative." The personal video clips area 224 now presents one or more video clips 252 that are accessible by the second user account and not necessarily accessible by user accounts other than the second user account. The video preview area 222, the shared video clips area 226, and/or the project timeline area 228 may present the same information as is presented to the first user account in the first user interface 200.

The second user interface 250 and/or the video editor 108 may receive an input from the second user account that requests that an operation be performed on a video clip from the shared video clips area 226, such as the first video clip 234*a*. For example, the input may request that the second user interface 250 and/or the video editor 108 add the first video clip 234*a* to a particular location within the video timeline 230. The second user interface 250 may also receive inputs from the second user account that add video clips from the personal video clips area 224 for the second user account to the shared video clips area 226 for the video project 110. In addition, the second user interface 250 may receive inputs from the second user account that remove video clips from the video timeline 230 and/or the shared video clips area 226.

The second user interface 250 further includes one or more media controls 254. The second user interface 250 may receive selections from the second user account of the media controls 254 to request presentation of other media, such as images and/or audio. The second user interface 250 may present the selected media type in the same space as or in place of the personal video clips area 224. As with the personal video clips area 224, the selected media may present instances of the selected media type, such as images or audio clips, which are accessible by the second user account and not necessarily accessible by user accounts other than the second user account. The second user interface 250 may also present a shared media area for the selected media type, such as in the same space or in place of the shared video clips area 226. The second user interface 250 may then receive inputs that add instances of the selected media type to the shared media area and/or the project timeline area 228.

Finally, the second user interface 250 may include a publish control 256. The second user interface 250, the first user interface 200, and/or the video editor 108 may receive a selection of the publish control 256 indicating a request to publish the video 122 for the video project 110. The video editor 108 may then make the video 122 available to other users and/or user accounts. For example, the video editor 108 may render the video 122 in one or more formats and store the video 122 in the video storage 112. The video server 124 may receive requests for the video 122, retrieve the video 122 from the video storage 112, and provide the video 122 to the requesters.

Figure 3:
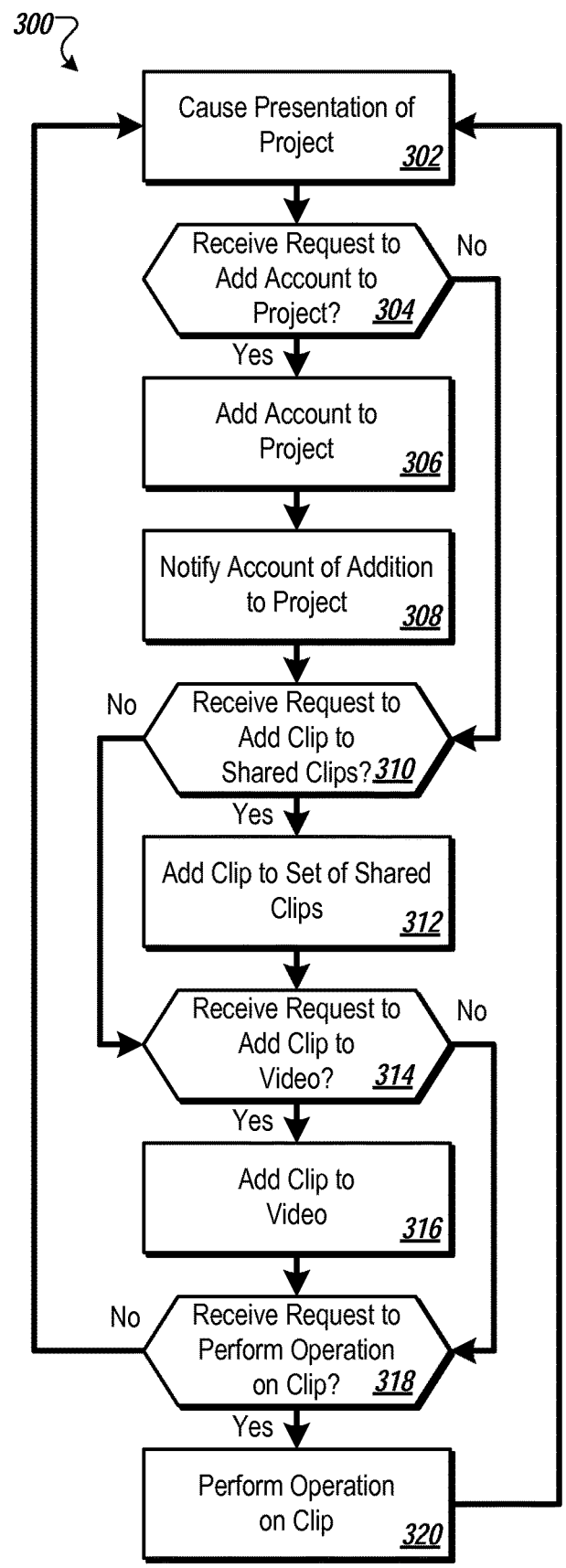
FIG. 3 is flow chart that shows an example of a process for collaborative video editing in a cloud environment.

FIG. 3 is flow chart that shows an example of a process 300 for collaborative video editing in a cloud environment. The process 300 may be performed, for example, by a system such as the system 100, the first user interface 200, and the second user interface 250. For clarity of presentation, the description that follows uses the system 100, the first user interface 200, and the second user interface 250 as examples for describing the process 300. However, another system, or combination of systems, may be used to perform the process 300.

At box 302, the process 300 begins with causing presentation of a collaborative video project to a first user account in a plurality of user accounts with which the collaborative video project is shared. The collaborative video project presented to the first user account includes a set of one or more shared video clips that are accessible by the plurality of user accounts and a set of one or more personal video clips that are accessible by the first user account and not necessarily accessible by user accounts other than the first user account. For example, the video editor 108 may cause presentation of the first user interface 200 at the first client computer device 104a to the first user with the first user account (e.g., the user named Adam).

At box 304, if a user input is received from the first user account that includes a request to add an additional user account to the plurality of user accounts, then at box 306, the process 300 includes adding the additional user account to the plurality of user accounts with which the collaborative video project is shared. For example, the video editor 108 may receive one or more requests from the first user account (e.g., Adam's account) at the first client computer device 104a to add the second user account (e.g., Bertha's account) and a third user account (e.g., Charlie's account) to the collaborators for the video project 110. In some implementations, the request to add collaborators may be provided prior to creation of the video project 110 and/or not specific to the video project 110. For example, a first user account may share a particular album of videos and/or images within a social network with another user account and assign editing permissions to the other user account. Upon adding a video to the album and initiating a video editing project for the video, the video editor 108 may automatically make the other user a collaborator on the video editing project. Otherwise, if a request to add an additional user account to the plurality of user accounts is not received, then the process 300 proceeds to box 310.

At box 308, in response to adding the additional user account to the plurality of user accounts, the process 300 includes sending a notification to the additional user account that the additional user account has been added to the plurality of user accounts. The notification may include a link to the collaborative video project. For example, the video editor 108 may send email notifications to the second user account for Bertha and the third user account for Charlie with a link to the video project 110 in response to the requests from the first user account to add the second user account and the third user account to the collaborators for the video project 110.

At box 310, if a user input is received from the first user account that includes a request to add a video clip in the set of one or more personal video clips to the set of one or more shared video clips, then at box 312, the process 300 includes adding the video clip to the set of one or more shared video clips. For example, the video editor 108 may receive a request from one of the user accounts collaborating on the project (e.g., Adam's account) to add a video clip from the personal video clips area 224 to the shared video clips area 226 for the video project 110. Otherwise, if a request to add a video clip to the set of one or more shared video clips is not received, then the process 300 proceeds to box 314.

At box 314, if a user input is received that includes a request to add the video clip from the shared set of one or more video clips to a collaborative video for the collaborative video project, then at box 316, the process 300 includes adding the video clip to the collaborative video. For example, the video editor 108 may receive a request from one of the accounts collaborating on the project, such as Adam's account, to add to the video 122 one or more of the video clips 116 that other user accounts, such as Bertha's account and/or Charles' account, authorized him to use. Otherwise, if a user input that includes a request to add the video clip to the collaborative video is not received, then the process 300 proceeds to box 318.

At box 318, if a user input is received that includes a selection of a video editing operation to perform on the video clip in the collaborative video, then at box 320, the process 300 includes performing the video editing operation on the video clip in the collaborative video. For example, while Adam is piecing together the video using his personal clips and/or the clips that have been shared with him by Bertha and/or Charles, the video editor 108 may receive a request from another account, such as Bertha's account, to add a transition or text annotation to a video clip in the video 122, such as for an opening title and closing credits. In addition, while Adam is adding clips and Bertha is adding transitions and annotations, the video editor 108 may receive a request from another account (e.g., Charlie) to add enhancements to the video clips that Adam chose, such as stabilization and color correction. Once editing is complete, the video editor 108 may receive a request from a user (e.g., Adam) to publish the video to his account. The video editor 108 may then automatically apply credits to the contributions made by the other users (e.g., Bertha and Charles). Otherwise, if a user input that includes a selection of a video editing operation to perform on the video clip in the collaborative video is not received, then the process 300 may return to box 302.

In response to a selection of the link by the second user account, the process 300 may include receiving a request to present the collaborative video project. In response, at box 302, the process 300 may include causing presentation of the collaborative video project to the second user account. The collaborative video project presented to the second user account includes the set of one or more shared video clips and a set of one or more personal video clips that are accessible by the second user account and not necessarily accessible by user accounts other than the second user account.

In some implementations, each user account in the plurality of user accounts may include any user account that has access to a link to the collaborative video project. Alternatively, each user account in the plurality of user accounts may have been specifically identified by another member of the plurality of user accounts as a collaborator for the collaborative video project.

While shown in FIG. 3 as a linear flow, one or more steps of the process 300 may be performed concurrently. For example, at box 302 for the second user account, the process 300 may cause presentation of the video project to the second user account while one or more of the steps of the process 300 occur for the first user account. In another example, at box 314 for the second user account, the process 300 may include receiving an input from the second user account that includes a request to add a video clip that was shared by the first user account to the collaborative video. This may occur while another step of the process 300 is being performed for the first user account.

Figure 4:
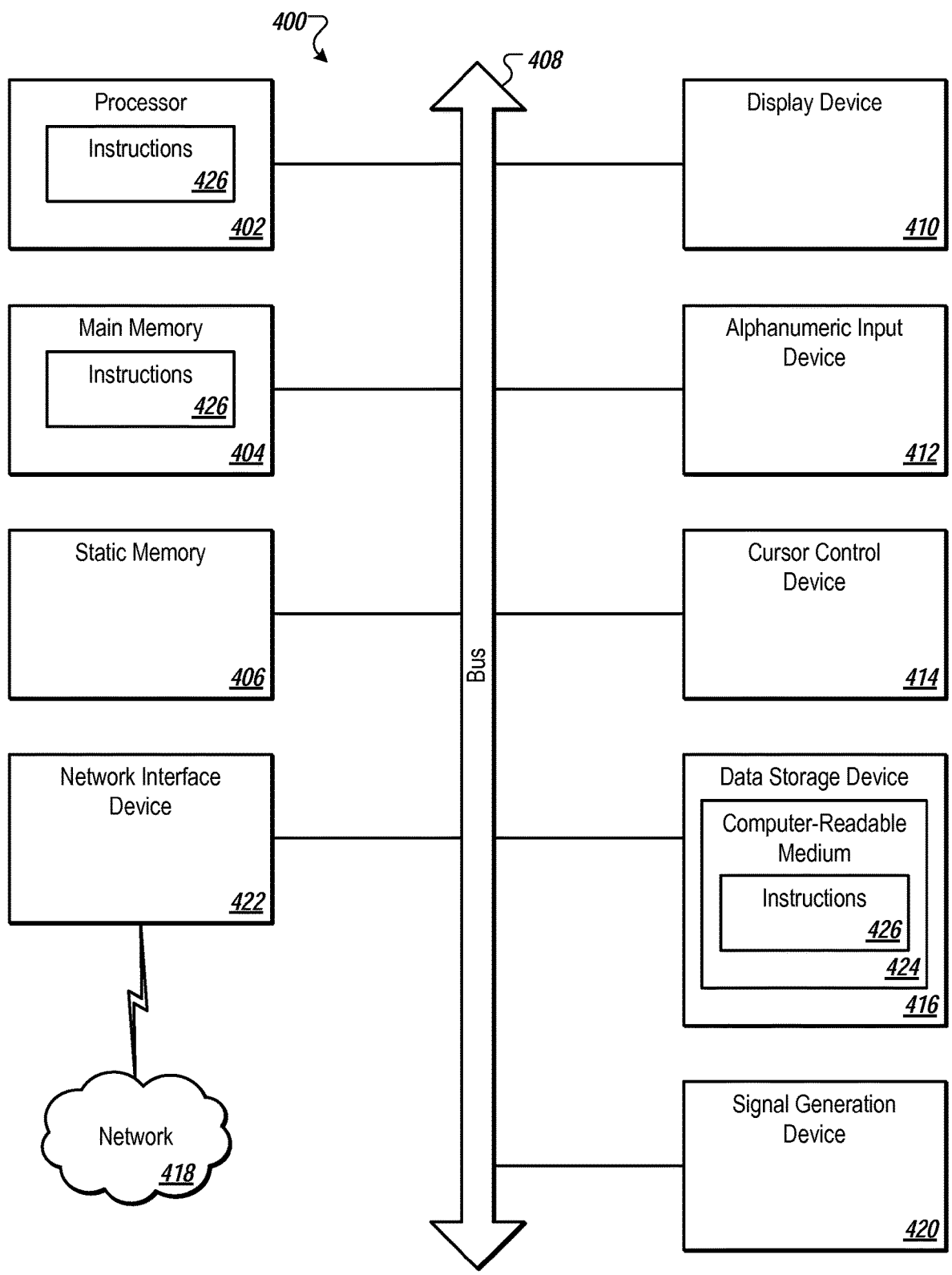
FIG. 4 is a schematic diagram that shows an example of a computer system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the video management system 102 and/or the client computer devices 104a-c for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the video management system 102 and/or the client computer devices 104a-c embodying any one or more of the methodologies or functions described herein. The sets of instructions 426 of the video management system 102 and/or the client computer devices 104a-c may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   providing, by a processing device, a first graphical user interface (GUI) of a collaborative video project for presentation on a first client device for a first user account in a plurality of user accounts with which the collaborative video project is shared, the first GUI having a plurality of areas comprising a first personal video clip area, a first shared video clip area, a first project timeline area, and a sharing input control area, wherein the first personal video clip area is to present a first set of one or more personal video clips that are accessible to the first user account and not accessible to user accounts other than the first user account, the first set of one or more personal video clips including a first video clip, wherein the sharing input control area presents a plurality of sharing types to share the collaborative video project, the plurality of sharing types are selectable by the first user account, the plurality of sharing types comprising a private sharing type and a private collaborative sharing type;
   receiving, from the first client device via the first GUI, a first user input to select the private collaborative sharing type, among the plurality of sharing types presented at the sharing input control area, to share the collaborative video project with a second user account, wherein the first user input comprises an indication of a selection of the private collaborative sharing type and an identifier of the second user account with which the collaborative video project is to be shared;
   receiving, from the first client device via the first GUI, a second user input to share the first video clip for the collaborative video project, wherein the second user input comprises a selection of the first video clip in the first set of one or more personal video clips within the first personal video clip area of the first GUI presented for the first user account;
   in response to receiving the second user input, providing an updated first GUI of the collaborative video project for presentation on the first client device for the first user account, wherein the updated first GUI of the collaborative video project includes an updated first shared video clip area, and wherein the first video clip is to be presented in the updated first shared video clip area and in the first personal video clip area of the updated first GUI;
   providing, by the processing device, a second GUI of the collaborative video project for presentation on a second client device for the second user account in the plurality of user accounts, the second GUI having a plurality of areas comprising a second personal video clip area, a second shared video clip area, and a second project timeline area, wherein the second shared video clip area, which corresponds to the first shared video clip area of the first GUI, is to present the first video clip, and wherein the second project timeline area, which corresponds to the first project timeline area of the first GUI, is to present a collaborative video;
   receiving, from the second client device via the second GUI, a third user input to add the first video clip to the collaborative video, wherein the third user input comprises a selection of the first video clip in the second shared video clip area of the second GUI presented for the second user account;
   receiving, from the first client device via the first GUI, a fourth user input to edit the first video clip, wherein the fourth user input comprises a selection of the first video clip in the updated first shared video clip area of the updated first GUI presented for the first user account; and
   in response to receiving the third user input, providing an updated second GUI of the collaborative video project for presentation on the second client device for the second user account, wherein the updated second GUI of the collaborative video project includes an updated second project timeline area, and wherein the first video clip is to be presented in the updated second project timeline area as a part of the collaborative video and in the second shared video clip area of the updated second GUI.

2. The method of claim 1, further comprising:
in response to receiving the fourth user input, editing the first video clip.

3. The method of claim 2, further comprising:
receiving a fifth user input from the second client device for the second user account, wherein the fifth user input comprises a selection of a second video clip in a second set of one or more personal video clips within the second personal video clip area of the second GUI presented for the second user account; and
in response to receiving the fifth user input, adding the second video clip to both a set of one or more shared video clips and the collaborative video within the second GUI.

4. The method of claim 3, further comprising:
receiving a sixth user input from a computer device for the second user account, wherein the sixth user input comprises a selection of a second video editing operation to perform on the second video clip in the collaborative video within the second GUI presented for the second user account; and
in response to receiving the sixth user input, performing the second video editing operation on the second video clip in the collaborative video within the second GUI.

5. The method of claim 1, further comprising:
receiving a seventh user input from the first client device for the first user account, wherein the seventh user input comprises a request to add the second user account to the plurality of user accounts; and
in response to receiving the seventh user input, adding the second user account to the plurality of user accounts with which the collaborative video project is shared.

6. The method of claim 5, further comprising:
in response to adding the second user account to the plurality of user accounts, sending a notification to the second user account that the second user account has been added to the plurality of user accounts, wherein the notification comprises a link to the collaborative video project; and
in response to a selection of the link by the second user account, receiving a request to present the collaborative video project.

7. The method of claim 6, wherein each user account in the plurality of user accounts has access to the link.

8. A non-transitory computer-readable medium having instructions stored thereon that, when executed by a processing device, cause the processing device to perform operations comprising:
providing, by the processing device, a first GUI of a collaborative video project for presentation on a first client device for a first user account in a plurality of user accounts with which the collaborative video project is shared, the first GUI having a plurality of areas comprising a first personal video clip area, a first shared video clip area, a first project timeline area, and a sharing input control area, wherein the first personal video clip area is to present a first set of one or more personal video clips that are accessible to the first user account and not accessible to user accounts other than the first user account, the first set of one or more personal video clips including a first video clip, wherein the sharing input control area presents a plurality of sharing types to share the collaborative video project, the plurality of sharing types are selectable by the first user account, the plurality of sharing types comprising a private sharing type and a private collaborative sharing type;
receiving, from the first client device via the first GUI, a first user input to select the private collaborative sharing type, among the plurality of sharing types presented at the sharing input control area, to share the collaborative video project with a second user account, wherein the first user input comprises an indication of a selection of the private collaborative sharing type and an identifier of the second user account with which the collaborative video project is to be shared;
receiving, from the first client device via the first GUI, a second user input to share the first video clip for the collaborative video project, wherein the second user input comprises a selection of the first video clip in the first set of one or more personal video clips within the first personal video clip area of the first GUI presented for the first user account;
in response to receiving the second user input, providing an updated first GUI of the collaborative video project for presentation on the first client device for the first user account, wherein the updated first GUI of the collaborative video project includes an updated first shared video clip area, and wherein the first video clip is to be presented in the updated first shared video clip area and in the first personal video clip area of the updated first GUI;
providing, by the processing device, a second GUI of the collaborative video project for presentation on a second client device for the second user account in the plurality of user accounts, the second GUI having a plurality of areas comprising a second personal video clip area, a second shared video clip area, and a second project timeline area, wherein the second shared video clip area, which corresponds to the first shared video clip area of the first GUI, is to present the first video clip, and wherein the second project timeline area, which corresponds to the first project timeline area of the first GUI, is to present a collaborative video;
receiving, from the second client device via the second GUI, a third user input to add the first video clip to the collaborative video, wherein the third user input comprises a selection of the first video clip in the second shared video clip area of the second GUI presented for the second user account;
receiving, from the first client device via the first GUI, a fourth user input to edit the first video clip, wherein the fourth user input comprises a selection of the first video clip in the updated first shared video clip area of the updated first GUI presented for the first user account; and
in response to receiving the third user input, providing an updated second GUI of the collaborative video project for presentation on the second client device for the second user account, wherein the updated second GUI of the collaborative video project includes an updated second project timeline area, and wherein the first video clip is to be presented in the updated second project timeline area as a part of the collaborative video and in the second shared video clip area of the updated second GUI.

9. The non-transitory computer-readable medium of claim 8, wherein the operations further comprise:
in response to receiving the fourth user input, editing the first video clip.

10. The non-transitory computer-readable medium of claim 9, wherein the operations further comprise:
receiving a fifth user input from the second client device for the second user account, wherein the fifth user input comprises a selection of a second video clip in a second set of one or more personal video clips within the second personal video clip area of the second GUI presented for the second user account; and in response to receiving the fifth user input, adding the second video clip to both a set of one or more shared video clips and the collaborative video within the second GUI.

11. The non-transitory computer-readable medium of claim 10, wherein the operations further comprise:

receiving a sixth user input from a computer device for the second user account, wherein the sixth user input comprises a selection of a second video editing operation to perform on the second video clip in the collaborative video within the second GUI presented for the second user account; and in response to receiving the sixth user input, performing the second video editing operation on the second video clip in the collaborative video within the second GUI.

12. The non-transitory computer-readable medium of claim 8, wherein the operations further comprise:

receiving a seventh user input from the first client device for the first user account, wherein the seventh user input comprises a request to add the second user account to the plurality of user accounts; and in response to receiving the seventh user input, adding the second user account to the plurality of user accounts with which the collaborative video project is shared.

13. The non-transitory computer-readable medium of claim 12, wherein the operations further comprise:

in response to adding the second user account to the plurality of user accounts, sending a notification to the second user account that the second user account has been added to the plurality of user accounts, wherein the notification comprises a link to the collaborative video project; and in response to a selection of the link by the second user account, receiving a request to present the collaborative video project.

14. A system comprising:

a memory; and a processing device operatively coupled to the memory, the processing device to perform operations comprising:

providing a first GUI of a collaborative video project for presentation on a first client device for a first user account in a plurality of user accounts with which the collaborative video project is shared, the first GUI having a plurality of areas comprising a first personal video clip area, a first shared video clip area, a first project timeline area, and a sharing input control area, wherein the first personal clip video area is to present a first set of one or more personal video clips that are accessible to the first user account and not accessible to user accounts other than the first user account, the first set of one or more personal video clips including a first video clip, wherein the sharing input control area presents a plurality of sharing types to share the collaborative video project, the plurality of sharing types are selectable by the first user account, the plurality of sharing types comprising a private sharing type and a private collaborative sharing type;

receiving, from the first client device via the first GUI, a first user input to select the private collaborative sharing type, among the plurality of sharing types presented at the sharing input control area, to share the collaborative video project with a second user account, wherein the first user input comprises an indication of a selection of the private collaborative sharing type and an identifier of the second user account with which the collaborative video project is to be shared;

receiving, from the first client device via the first GUI, a second user input to share the first video clip for the collaborative video project, wherein the second user input comprises a selection of the first video clip in the first set of one or more personal video clips within the first personal video clip area of the first GUI presented for the first user account;

in response to receiving the second user input, providing an updated first GUI of the collaborative video project for presentation on the first client device for the first user account, wherein the updated first GUI of the collaborative video project includes an updated first shared video clip area, and wherein the first video clip is to be presented in the updated first shared video clip area and in the first personal video clip area of the updated first GUI;

providing a second GUI of the collaborative video project for presentation on a second client device for the second user account in the plurality of user accounts, the second GUI having a plurality of areas comprising a second personal video clip area, a second shared video clip area, and a second project timeline area, wherein the second shared video clip area, which corresponds to the first shared video clip area of the first GUI, is to present the first video clip, and wherein the second project timeline area, which corresponds to the first project timeline area of the first GUI, is to present a collaborative video;

receiving, from the second client device via the second GUI, a third user input to add the first video clip to the collaborative video, wherein the third user input comprises a selection of the first video clip in the second shared video clip area of the second GUI presented for the second user account;

receiving, from the first client device via the first GUI, a fourth user input to edit the first video clip, wherein the fourth user input comprises a selection of the first video clip in the updated first shared video clip area of the updated first GUI presented for the first user account; and in response to receiving the third user input, providing an updated second GUI of the collaborative video project for presentation on the second client device for the second user account, wherein the updated second GUI of the collaborative video project includes an updated second project timeline area, and wherein the first video clip is to be presented in the updated second project timeline area as a part of the collaborative video and in the second shared video clip area of the updated second GUI.

15. The system of claim 14, wherein the operations further comprise:

in response to receiving the fourth user input, editing the first video clip.

16. The system of claim 15, wherein the operations further comprise:

receiving a fifth user input from the second client device for the second user account, wherein the fifth user input comprises a selection of a second video clip in a second set of one or more personal video clips within the second personal video clip area of the second GUI presented for the second user account; and in response to receiving the fifth user input, adding the second video clip to both a set of one or more shared video clips and the collaborative video within the second GUI.

17. The system of claim 16, wherein the operations further comprise:
   receiving a sixth user input from a computer device for the second user account, wherein the sixth user input comprises a selection of a second video editing operation to perform on the second video clip in the collaborative video within the second GUI presented for the second user account; and
   in response to receiving the sixth user input, performing the second video editing operation on the second video clip in the collaborative video within the second GUI.

18. The system of claim 14, wherein the operations further comprise:
   receiving a seventh user input from the first client device for the first user account, wherein the seventh user input comprises a request to add the second user account to the plurality of user accounts; and
   in response to receiving the seventh user input, adding the second user account to the plurality of user accounts with which the collaborative video project is shared.

19. The system of claim 18, wherein the operations further comprise:
   in response to adding the second user account to the plurality of user accounts, sending a notification to the second user account that the second user account has been added to the plurality of user accounts, wherein the notification comprises a link to the collaborative video project; and
   in response to a selection of the link by the second user account, receiving a request to present the collaborative video project.

* * * * *